United States Patent Office 3,151,051
Patented Sept. 29, 1964

3,151,051
SYNTHESIS OF FLUORINE COMPOUNDS
Milton Braid, Springfield Township, Montgomery County, and Francis Lawlor, Philadelphia, Pa., assignors to Pennsalt Chemicals Corporation, a corporation of Pennsylvania
No Drawing. Filed Mar. 14, 1957, Ser. No. 645,891
10 Claims. (Cl. 204—158)

This invention relates to a method for the synthesis of fluorine compounds and, more particularly, to a method for the production of fluorinated acetic acids and salts thereof, fluorinated acetic acid chlorides and bromides, and fluoroacetaldehydes.

Trifluoroacetic acid, the related compound difluoromonochloroacetic acid, and derivatives thereof, e.g., the corresponding salts, acid halides, and aldehyde hydrates, are known to the art. These compounds are useful in a variety of different applications; for example, as metal cleaners, catalysts, condensing agents and the like; in the preparation of herbicides, insecticides, and dyes, etc. The use of these compounds has not been widespread, however, because of the difficulty and expense involved in their manufacture. In accordance with the present invention, provision is made for a simple and relatively inexpensive method by which trifluoroacetic and difluoromonochloroacetic acids and salts thereof, the corresponding acid chlorides and bromides, and the related aldehyde hydrates may be made, by oxidizing certain halogenated ethanes.

In particular, the invention provides a method for the oxidation of halogenated ethanes having the general formula $CF_2MCXYZ$, where M is selected from the group consisting of chlorine and fluorine, where X and Y are selected from the group consisting of hydrogen, chlorine and bromine, and where Z is selected from the group consisting of chlorine and bromine, which comprises bringing the said compound into reactive association with a source of free radicals in the presence of a source of oxygen under conditions giving rise to free radicals from said source of free radicals and to oxygen from said source of oxygen. By this reactive association of a halogenated ethane with oxygen in the presence of free radicals, there is formed a compound of the formula

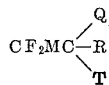

where Q and R taken separately are each OH and taken collectively are =O; T is H when Q and R are OH, and when Q and R are =O, T is selected from OH, Br, and Cl. The product of the reaction, as represented by the above formula, is an aldehyde hydrate, acid, or acid chloride or bromide, depending upon the conditions of the reaction and the choice of starting material.

Specific halogenated ethanes which may be oxidized according to the present invention include for example $CF_3CH_2Cl$, $CF_3CH_2Br$, $CF_2ClCH_2Cl$, $CF_3CCl_3$, $CF_3CHCl_2$, $CF_3CHBr_2$, $CF_3CBr_3$, $CF_3CBr_2Cl$, and $CF_3CHBrCl$.

The halogenated compounds serving as starting materials for the process of the invention are generally well known to the art. The concluding two compounds in the preceding list, $CF_3CBr_2Cl$ and $CF_3CHBrCl$, are novel compounds which may be prepared as described in a copending application by one of the present inventors, Francis Lawlor, Serial No. 626,820 filed December 7, 1956, and now abandoned.

The source of free radicals may, in general, be any compound which will form free radicals at a lower energy level than is necessary to form free radicals from the halogenated ethane used or than that at which the desired products decompose. One class of presently useful free radical sources comprises peroxide initiators such as benzoyl peroxide, acetyl peroxide, di-tert-butyl peroxide or trifluoroperacetic acid ($CF_3CO_3H$). Alternatively, there may be used inorganic free radical sources, e.g., chlorine, ozone, or even oxygen itself, in the presence of energizing radiation leading to the formation of monatomic oxygen. Chlorine is a particularly preferred free radical source in the process of the invention.

The source of oxygen may be oxygen itself, ozone or a peroxide. It will be appreciated that the invention embraces embodiments wherein the source of free radicals and the source of oxygen are identical, as exemplified by the use of monatomic oxygen, ozone or peroxides; and also embodiments wherein the free radical sources and oxygen sources are distinct, as illustrated by a simultaneous addition of chlorine and oxygen to the halogenated ethane starting material. If desired, when the source of free radicals also supplies oxygen to the reaction, additional oxygen may also be introduced separately.

To achieve reaction, it is merely necessary to raise the energy level of the free radical source to the point at which it forms free radicals. This may be done by means of heat, ultraviolet, gamma, X or high energy electron radiation, or combinations of these agencies. The amount and degree of such energization and indeed, whether any external energization is necessary will depend upon the particular free radical source used.

Thus, for example, when chlorine is used, some form of external energization is necessary. Any of the forms mentioned above may be used. When heat is used, care must be taken to keep the temperature below that at which the products become unstable under the reaction conditions, i.e., below around 250° C.; in general for energization by heat alone, temperatures above about 200° C. will be employed. With ultraviolet or other radiation, temperatures as low as −30° C. or below can be used.

When oxygen is employed as the free radical source, under conditions leading to the formation of monatomic oxygen, a preferred form of external energization is shortwave radiation, for example, ultraviolet rays and the like.

No additional external energization is necessary when ozone is used as the source of free radicals, ozone itself being at a sufficiently high energy level to form free radicals spontaneously. The reaction of the invention can be carried out if desired, however, in the presence of ultraviolet or other radiation, at a wide range of temperatures, for example, at −20° C., or up to 250° C.

When peroxides are used as the source of free radicals, the energization level required is that necessary to produce decomposition of the peroxide. This will vary with the particular peroxide. Where heat alone is used for peroxide breakdown, the temperature may be anywhere from say −10° C. up to the decomposition point of the products; usual convenient temperatures will be between 50° C. and about 150° C. Alternatively, ultraviolet, gamma, X or electron radiation may be employed, and in this case, the reaction temperature may range between about −35° C., and about 150° C. In certain instances, a peroxide may be formed in situ, using a hydrocarbon and oxygen; for example, propane may be reacted with oxygen to form a peroxide which will in turn form free radicals to attack the halogenated ethane.

Pressure is not generally a critical factor and may be atmospheric, subatmospheric, or superatmospheric. Pressures up to say 150 atmospheres may be employed; moderate pressures of up to about 20 atmospheres are preferred.

The time of reaction is not critical. In general, it will depend upon the nature of the source of free radicals used, on the type of energization employed, and on the temperature of the reaction. Ordinarily reaction times will vary from less than one minute to several hours.

The proportion of free radical source employed will in general be between about $\frac{1}{10}$ or less up to about 3 equivalents of free radical source per mole of halogenated ethane. With respect to the oxygen source, at least one gram-atom of available oxygen must be furnished for every gram-mole of halogenated ethane which is oxidized. (By "available oxygen" is meant oxygen which is free to combine with the haloethane under conditions of the reaction.) Preferably between about one and six gram-atoms of oxygen are present per gram-mole of halogenated ethane reactant.

The ratio of free radical source to oxygen source is not critical; thus, for example, when a chlorine-oxygen system is employed, either chlorine or oxygen may be in excess.

The products obtained by bringing one of the presently useful halogenated ethanes into reactive association with free radicals and oxygen in accordance with the present oxidation process vary, depending on both the reaction conditions and on the choice of starting material. When the oxidation is carried out under anhydrous conditions, the product is the acid halide, of formula $CF_2MCOZ$, where M is chlorine or fluorine and Z is chlorine or bromine. The acid halide may be isolated from the reactor effluent, e.g., by condensation, and, if desired, purified by, for example, distillation; alternatively, the product acid halide may be absorbed in aqueous solution, to convert it by hydrolysis to the acid, or in a solution of a base, whereby the corresponding acid salt is formed. The choice of base in the latter process will be determined by the particular salt desired; thus, e.g., by employing a caustic soda solution for absorption, the sodium salt is formed, etc.

Even when anhydrous conditions are employed for the process, in the cases when halogenated ethanes which contain hydrogen atoms are used as starting materials in accordance with this invention, water will be formed in situ in the course of the oxidation reaction. This production of water occurs because of reaction of the hydrogen atoms of the halogenated ethane with the oxygen furnished to the reaction. Accordingly, the formation of fluoroacetic acids, derived by hydrolysis of the acid halides by water produced in situ, may accompany the production of the corresponding acid halides to some degree, even under anhydrous conditions.

When water is introduced into the reaction zone in which the process of the invention is carried out, the acid, of formula $CF_2MCOOH$, where M is chlorine or fluorine, is formed. We have further made the surprising discovery that in the presence of water, when the starting material employed in the present oxidation process is a halogenated ethane of the formula $CF_2MCH_2Z$, M and Z being respectively as defined hereinabove, the corresponding aldehyde hydrate, $CF_2MCHO.H_2O$ or, alternatively written, $CF_2M.CH(OH)_2$, is obtained as a reaction product. This is a highly unexpected result, since aldehydes are generally considered readily oxidized materials, and it would have been predicted that any aldehyde formed under oxidizing conditions would immediately be further oxidized to acid. To the contrary, fluoroacetaldehyde hydrates are obtained in good yields in accordance with the present process.

When the present reaction is carried out in the presence of water, the acid produced, together with any aldehyde hydrate formed, will be absorbed in the aqueous phase, from which these products may be recovered by processes such as extraction, precipitation, etc.

The invention will be further described with reference to the following specific examples. These examples are given for purposes of illustration only and are not to be taken as in any way restricting the invention.

*Example 1*

In respective gas volume ratios of 2.5:8:9, a mixture of oxygen, chlorine, and trifluoroethyl chloride ($CF_3CH_2Cl$) was passed through a vessel of about 2 l. volumes containing about 250 ml. of water and illuminated by an internal ultraviolet lamp, the whole apparatus being shaken to give good contact. The passage of 49 g. of trifluoroethyl chloride required 2.5 hours. The reactor liquid was then washed with dilute sodium thiosulphate solution to remove chlorine and boiled with 30% hydrogen peroxide to remove sulphur precipitated by this washing. The resulting solution was extracted with ether, and the extract dried and fractionated to give a 15% yield of trifluoroacetaldehyde hydrate. The extracted aqueous portion was made slightly basic with dilute caustic and evaporated to dryness to give a 28% yield of sodium trifluoroacetate. Trifluoroacetic acid is recovered by treatment of this salt with concentrated $H_2SO_4$, followed by distillation of the organic acid from the acid mixture.

*Example 2*

A gaseous mixture of trifluoroethyl chloride, chlorine and oxygen, in a molar ratio of 1:1.8:0.36, was passed through a continuously agitated reactor containing 250 ml. of water and internally illuminated by ultraviolet irradiation. The introduction of 25 g. (0.212 mole) of trifluoroethyl chloride required 1.5 hours. Trifluoroacetic acid was isolated as the sodium salt by a procedure as described above.

*Example 3*

This example illustrates the use of ozone as a free radical source in the process of the invention.

A measured quantity of oxygen was partially converted to ozone by passage through a 15 kv. corona. During 2.6 hours, approximately 16.5 g. of an oxygen-ozone mixture prepared in this way was passed, together with 60 g. (0.506 mole) of trifluoroethyl chloride, through a glass reactor maintained at 115–121° C. by external heating. The effluent gas, containing trifluoroacetyl chloride, trifluoroacetic acid, and unreacted trifluoroethyl chloride, was passed through a water absorber in which the acyl halide was completely hydrolyzed. Trifluoroacetic acid was isolated from the absorber solution as the sodium salt.

*Example 4*

Fifty grams of trifluoroethyl chloride were passed with an equimolar amount of oxygen containing some ozone through a reactor externally cooled to −10° to −11° C., over a period of 3¼ hours. Sodium trifluoroacetate was obtained on working up the reactor effluent as described in Example 3.

*Example 5*

This example illustrates the energization of oxygen to produce monatomic-oxygen free radicals in situ.

Trifluoroethyl chloride and oxygen in an equimolar ratio were passed for one-half hour into a reactor at 18–40° C. containing 500 ml. of water and internally illuminated by a 100 watt ultraviolet lamp. The molar ratio of trifluoroethyl chloride to oxygen was then increased to 1.7:1, and the introduction of the reactants was continued; 37 g. of the halogenated alkane were passed into the reactor during a total reaction time of 4 hours. After recovery of trifluoroethyl chloride (81.5% unreacted), trifluoroacetic acid was isolated from the remaining product.

*Example 6*

After ultraviolet irradiation of a mixture of chlorine, oxygen and 1,1,1-trichloro-2,2,2-trifluoroethane in a molar ratio of 3:2:5, under a pressure of 2 atmospheres, in the presence of water, for 72 hours, trifluoroacetic acid is isolated from the resulting reaction product in over 50% yield, based on $CF_3CCl_3$ reacted.

Example 7

By a procedure as described in Example 6, chlorodifluoroacetic acid is obtained from 1,1-difluoro-1,2-dichloroethane.

Example 8

Complete conversion of $CF_3CHCl_2$ to the corresponding fluorinated acid and acyl halide, mostly $CF_3COCl$, is obtained in less than 10 minutes when a 4:2:1 (molar ratio) oxygen:chlorine:$CF_3CHCl_2$ mixture, at a pressure of about 2 atmospheres, is exposed to ultraviolet irradiation.

Example 9

By photochemical oxidation of trifluoroethyl bromide in the presence of water under conditions as described above, trifluoroacetic acid and trifluoroacetaldehyde hydrate are obtained as the reaction products.

While the invention has been described with reference to particular preferred embodiments thereof, it will be appreciated that modifications and variations are possible within the scope of the invention.

What is claimed is:

1. A method for the production of compounds of the general formula $CF_2MCOOH$ where M is selected from the group consisting of chlorine and fluorine, which comprises subjecting a mixture of oxygen, chlorine, and a compound having the general formula $CF_2MCXYZ$ where X and Y are selected from the group consisting of hydrogen, chlorine and bromine, and Z is selected from the group consisting of bromine and chlorine, to radiant energization in the presence of water, said water being present in amount sufficient to absorb said $CF_2MCOOH$ in the aqueous phase, and recovering said compounds of the general formula $CF_2MCOOH$.

2. The method of claim 1 wherein the energization is provided by ultraviolet radiation.

3. A method for the production of compounds having the general formula $CF_2MCOOH$ where M is selected from the group consisting of chlorine and fluorine, which comprises subjectting a mixture of oxygen and a compound having the general formula $CF_2MCXYZ$ where X and Y are selected from the group consisting of hydrogen, chlorine and bromine, and Z is selected from the group consisting of bromine and chlorine, to radiant energization in the presence of water, said water being present in amount sufficient to absorb said $CF_2MCOOH$ in the aqueous phase, and recovering said compounds of the general formula $CF_2MCOOH$.

4. A method which comprises subjecting a mixture of chlorine, oxygen and $CF_3CH_2Cl$ to ultraviolet radiation in the presence of water, and isolating from the resulting reaction product, trifluoroacetic acid.

5. A method which comprises subjecting a mixture of chlorine, oxygen, and $CF_3CH_2Cl$ to ultraviolet radiation in the presence of water, and isolating from the resulting reaction product, trifluoroacetaldehyde hydrate.

6. The method for the production of trifluoroacetyl chloride which comprises subjecting a mixture of chlorine, oxygen and $CF_3CH_2Cl$ to ultraviolet irradiation under anhydrous conditions and recovering trifluoroacetyl chloride.

7. The method for the preparation of a mixture of trifluoroacetic acid and trifluoracetaldehyde hydrate which comprises subjecting a mixture of chlorine, oxygen and $CF_3CH_2Cl$ to ultraviolet radiation in the presence of water and recovering said mixture.

8. The method for the preparation of oxidized compounds which comprises subjecting a mixture of oxygen, chlorine and a compound having the general formula $CF_2MCXYZ$ where M is selected from the group consisting of chlorine and fluorine, X and Y are selected from the group consisting of hydrogen, chlorine and bromine, and Z is selected from the group consisting of bromine and chlorine to radiant energization and recovering oxidized products selected from the group consisting of the corresponding aldehyde hydrate, acid, acid chloride and acid bromide.

9. The method of claim 8 wherein said energization is provided by ultraviolet radiation and said mixture is subjected to said energization under anhydrous conditions to produce an acyl halide of the formula $CF_2MCOZ$ where M and Z are as defined in claim 8.

10. A method for the production of compounds having the general formulae $CF_2MCH(OH)_2$ and $CF_2MCOOH$ where M is selected from the group consisting of chlorine and fluorine which comprises bringing, in the presence of oxygen and water, a compound of the formula $CF_2MCH_2Z$ where Z is selected from the group consisting of bromine and chlorine into reactive association with a source of free radicals wherein said source of free radicals is chlorine which is energized to form free radicals by exposure to radiant energization, and recovering compounds of said general formulae.

References Cited in the file of this patent

UNITED STATES PATENTS

| | | |
|---|---|---|
| 2,321,823 | Kirkbride | June 15, 1943 |
| 2,712,555 | Miller | July 5, 1955 |
| 2,790,815 | Brice et al. | Apr. 30, 1957 |
| 2,807,579 | Molotsky et al. | Sept. 24, 1957 |

FOREIGN PATENTS

| | | |
|---|---|---|
| 765,700 | Great Britain | Jan. 9, 1957 |

OTHER REFERENCES

Francis et al., J. Chem. Soc., p. 2151 (1955), (London).

Barr et al. (I), J. Chem. Soc., p. 1881 (1955), (London).

Barr et al., (II) Nature, vol. 177, p. 785 (1956).